(12) United States Patent
Lee

(10) Patent No.: US 12,279,184 B2
(45) Date of Patent: Apr. 15, 2025

(54) ENHANCED VOICE MAIL ENVELOPE INFORMATION USING ENHANCED CALLING NAME AND CALLER IDENTITY ANALYTIC FUNCTIONS

(71) Applicant: LG ELECTRONICS INC., Seoul (KR)

(72) Inventor: Ki-Dong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 422 days.

(21) Appl. No.: 17/770,041

(22) PCT Filed: Oct. 29, 2020

(86) PCT No.: PCT/KR2020/014921
§ 371 (c)(1),
(2) Date: Apr. 18, 2022

(87) PCT Pub. No.: WO2021/086060
PCT Pub. Date: May 6, 2021

(65) Prior Publication Data
US 2022/0394434 A1 Dec. 8, 2022

Related U.S. Application Data

(60) Provisional application No. 62/931,210, filed on Nov. 5, 2019, provisional application No. 62/927,657, filed on Oct. 29, 2019.

(51) Int. Cl.
*H04W 4/12* (2009.01)
*H04W 4/16* (2009.01)
(Continued)

(52) U.S. Cl.
CPC ............... *H04W 4/12* (2013.01); *H04W 4/16* (2013.01); *H04W 12/06* (2013.01);
(Continued)

(58) Field of Classification Search
CPC ...... G06N 20/00; H04W 12/06; H04W 12/12; H04W 12/121; H04W 12/66; H04W 4/12; H04W 4/16; H04W 68/005
See application file for complete search history.

(56) References Cited

U.S. PATENT DOCUMENTS 10,165,114 B1 12/2018 Liu
10,498,887 B2 12/2019 Quilici et al.
(Continued)

OTHER PUBLICATIONS

3GPP TSG SA; IP Multimedia Core Network Subsystem (IMS) Multimedia Telephony Service and supplementary services; Stage 1 (Release 17); 3GPP TS 22.173 V17.0.0 (Sep. 2019), Sep. 27, 2019, sections 8.2.6.1-8.2.24.2.
(Continued)

*Primary Examiner* — Timothy X Pham
(74) *Attorney, Agent, or Firm* — BRYAN CAVE LEIGHTON

(57) ABSTRACT

A method and apparatus for enhanced voice mail envelope information using enhanced calling name (eCNAM) and caller identity analytic functions in a wireless communication system is provided. A network determines to use a voice mail associated with a call based on a determination that the call is missed or rejected by a user equipment (UE) or a paging is unsuccessful, and stores enhanced calling name (eCNAM) related envelope information for the voice mail. The eCNAM related envelope information includes (i) a caller identity analytic data for the call, (ii) a caller identifier (ID) for the call, (iii) a trust level of the caller ID, and (iv) a time stamp for the voice mail. The network transmits, to the UE, the voice mail and the eCNAM related envelope information.

17 Claims, 18 Drawing Sheets

(51) Int. Cl.
*H04W 12/06* (2021.01)
*H04W 12/121* (2021.01)
*H04W 12/60* (2021.01)
*H04W 68/00* (2009.01)

(52) U.S. Cl.
CPC ......... *H04W 12/121* (2021.01); *H04W 12/66* (2021.01); *H04W 68/005* (2013.01)

(56) References Cited

U.S. PATENT DOCUMENTS

| | | |
|---|---|---|
| 2004/0023643 A1 | 2/2004 | Vander Veen et al. |
| 2013/0072164 A1 | 3/2013 | Vadlm Balannik et al. |
| 2013/0136245 A1* | 5/2013 | Reyes ............... H04M 3/53333 379/88.19 |

OTHER PUBLICATIONS

3GPP TSG CN; Enhanced Calling Name (eCNAM); Release 15, 3GPP TS 24.196 V15.1.0 (Sep. 2019), Sep. 24, 2019, sections 4-4.6.15.

3GPP; TSG CN; Inter-IMS Network to Network Interface (NNI) (Release 16), 3GPP TS 29.165 V16.0.0 (Sep. 2019), Sep. 27, 2019, section 12.25.

* cited by examiner

FIG. 16

|   | 0 | 1 | 2 | 3 | 4 | 5 | 6 | 7 |
|---|---|---|---|---|---|---|---|---|
| 0 |   |   |   |   |   |   |   |   |
| 1 |   |   | (1,2) |   |   |   |   |   |
| 2 |   |   |   |   |   |   |   |   |
| 3 |   |   |   |   |   |   |   |   |
| 4 |   |   |   |   |   |   |   |   |
| 5 |   |   |   |   |   |   |   |   |
| 6 |   |   |   |   |   |   |   |   |
| 7 |   |   |   |   |   |   |   |   |

ENHANCED VOICE MAIL ENVELOPE INFORMATION USING ENHANCED CALLING NAME AND CALLER IDENTITY ANALYTIC FUNCTIONS

This application is the National Stage filing under 35 U.S.C. 371 of International Application No. PCT/KR2020/014921 filed on Oct. 29, 2020, which claims priority to U.S. Provisional Application Nos. 62/927,657 filed on Oct. 29, 2019 and 62/931,210 filed on Nov. 5, 2019, the contents of which are all hereby incorporated by reference herein in their entirety.

TECHNICAL FIELD

The present disclosure relates to enhanced voice mail envelope information using enhanced calling name (eCNAM) and caller identity analytic functions.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In 3GPP Rel-17, enhanced calling name (eCNAM) feature has been introduced. The eCNAM service provides the terminating user with the name associated with the originating user and optionally delivers metadata about that originating user. While eCNAM is a terminating service, the eCNAM operations rely on information received from the originating network, such as the originating user's E.164 telephone number (TN) to retrieve eCNAM data from trusted data sources.

SUMMARY

A method for applying eCNAM to voice mail may be required.

In an aspect, a method performed by a network configured to operate in a wireless communication system is provided. The method includes determining to use a voice mail associated with a call based on a determination that the call is missed or rejected by a user equipment (UE) or a paging is unsuccessful, storing enhanced calling name (eCNAM) related envelope information for the voice mail. The eCNAM related envelope information includes (i) a caller identity analytic data for the call, (ii) a caller identifier (ID) for the call, (iii) a trust level of the caller ID, and (iv) a time stamp for the voice mail. The method further includes transmitting, to the UE, the voice mail and the eCNAM related envelope information.

In another aspect, an apparatus for implementing the above method is provided.

The present disclosure can have various advantageous effects.

For example, the user can retrieve the trust level of caller ID and eCNAM analytic data when checking the voice mail even when the UE had no such information that was received from the network (e.g., missed paging).

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 16 shows an example of bit stream structure containing the caller ID with trust level and/or the eCNAM identity analytic data to which the technical features of the present disclosure can be applied.

DETAILED DESCRIPTION

Figure 1:
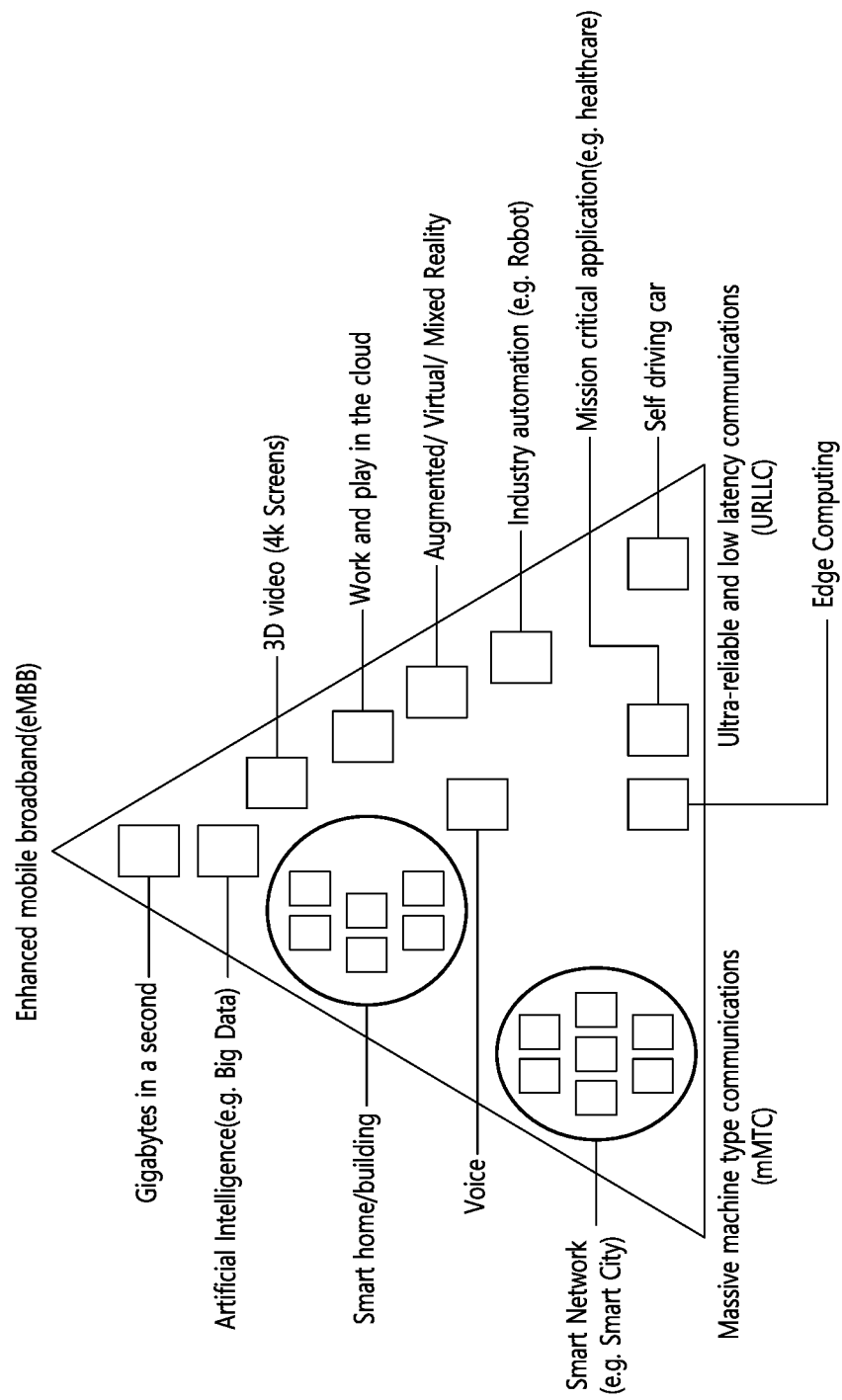
FIG. 1 shows examples of 5G usage scenarios to which the technical features of the present disclosure can be applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in downlink (DL) and SC-FDMA in uplink (UL). LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities.

Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
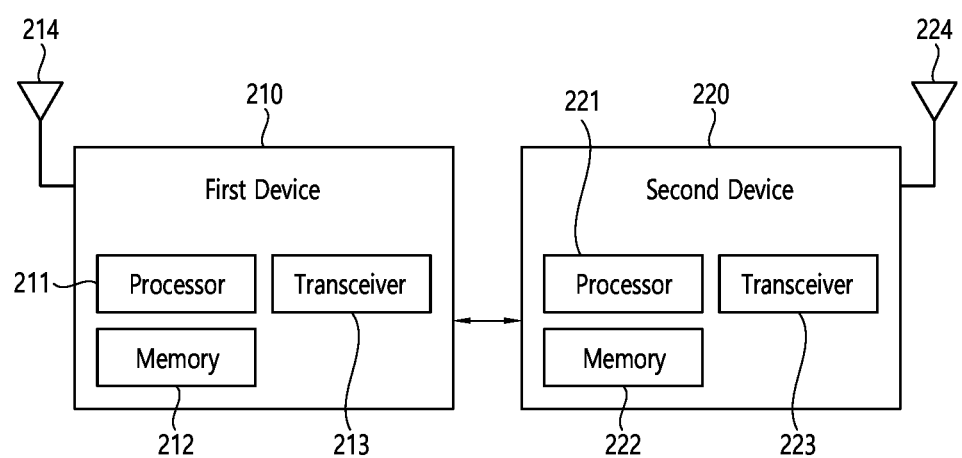
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting user equipment (UE), a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, the security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna.

For example, antenna 214 and/or antenna 224 may be configured to transmit and receive wireless signals.

Figure 3:
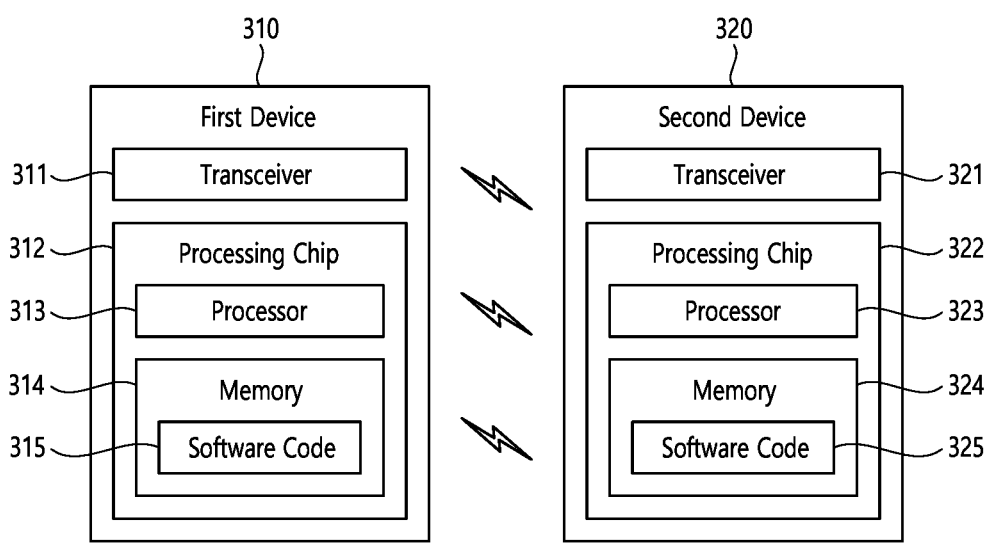
FIG. 3 shows another example of a wireless communication system to which the technical features of the present disclosure can be applied.

FIG. 3 shows another example of a wireless communication system to which the technical features of the present disclosure can be applied.

Referring to FIG. 3, wireless devices 310 and 320 may correspond to the wireless devices 210 and 220 of FIG. 2 and may be configured by various elements, components, units/portions, and/or modules.

The first wireless device 310 may include at least one transceiver, such as a transceiver 311, and at least one processing chip, such as a processing chip 312. The processing chip 312 may include at least one processor, such a processor 313, and at least one memory, such as a memory 314. The memory 314 may be operably connectable to the processor 313. The memory 314 may store various types of information and/or instructions. The memory 314 may store a software code 315 which implements instructions that, when executed by the processor 313, perform the descriptions, functions, procedures, suggestions, methods and/or operational flowcharts disclosed in the present disclosure. For example, the software code 315 may implement instructions that, when executed by the processor 313, perform the descriptions, functions, procedures, suggestions, methods and/or operational flowcharts disclosed in the present disclosure. For example, the software code 315 may control the processor 313 to perform one or more protocols. For example, the software code 315 may control the processor 313 may perform one or more layers of the radio interface protocol.

The second wireless device 320 may include at least one transceiver, such as a transceiver 321, and at least one processing chip, such as a processing chip 322. The processing chip 322 may include at least one processor, such a processor 323, and at least one memory, such as a memory 324. The memory 324 may be operably connectable to the processor 323. The memory 324 may store various types of information and/or instructions. The memory 324 may store a software code 325 which implements instructions that, when executed by the processor 323, perform the descriptions, functions, procedures, suggestions, methods and/or operational flowcharts disclosed in the present disclosure. For example, the software code 325 may implement instructions that, when executed by the processor 323, perform the descriptions, functions, procedures, suggestions, methods and/or operational flowcharts disclosed in the present disclosure. For example, the software code 325 may control the processor 323 to perform one or more protocols. For example, the software code 325 may control the processor 323 may perform one or more layers of the radio interface protocol.

Figure 4:
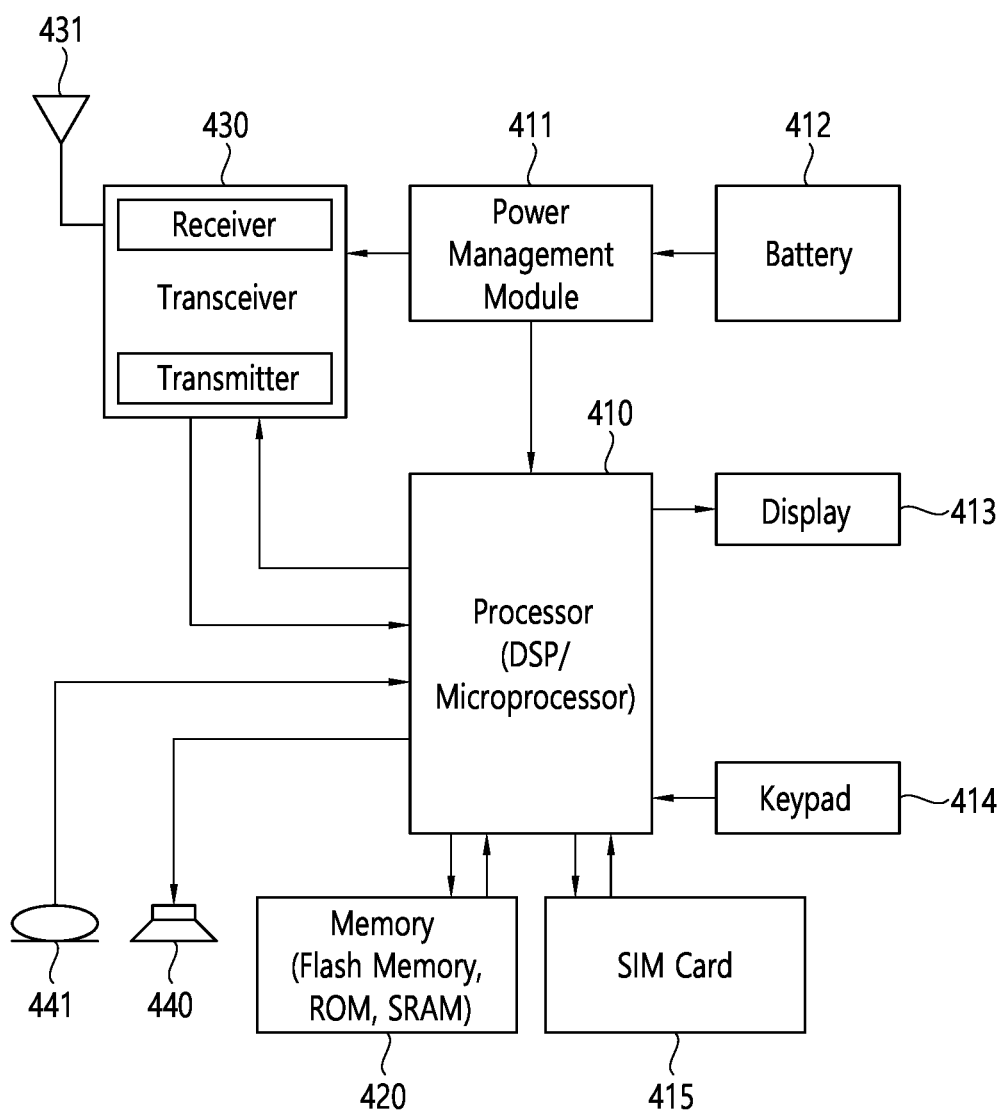
FIG. 4 shows a UE to which the technical features of the present disclosure can be applied.

FIG. 4 shows a UE to which the technical features of the present disclosure can be applied.

A UE includes a processor 410, a power management module 411, a battery 412, a display 413, a keypad 414, a subscriber identification module (SIM) card 415, a memory 420, a transceiver 430, one or more antennas 431, a speaker 440, and a microphone 441.

The processor 410 may be configured to implement the descriptions, functions, procedures, suggestions, methods and/or operational flowcharts disclosed in the present disclosure. The processor 410 may be configured to control one or more other components of the UE to implement the descriptions, functions, procedures, suggestions, methods and/or operational flowcharts disclosed in the present disclosure. Layers of the radio interface protocol may be implemented in the processor 410. The processor 410 may include ASIC, other chipset, logic circuit and/or data processing device. The processor 410 may be an application processor. The processor 410 may include at least one of a digital signal processor (DSP), a central processing unit (CPU), a graphics processing unit (GPU), a modem (modulator and demodulator). An example of the processor 410 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 411 manages power for the processor 410 and/or the transceiver 430. The battery 412 supplies power to the power management module 411. The display 413 outputs results processed by the processor 410. The keypad 414 receives inputs to be used by the processor 410. The keypad 414 may be shown on the display 413. The SIM card 415 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 420 is operatively coupled with the processor 410 and stores a variety of information to operate the processor 410. The memory 420 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 420 and executed by the processor 410. The memory 420 can be implemented within the processor 410 or external to the processor 410 in which case those can be communicatively coupled to the processor 410 via various means as is known in the art.

The transceiver 430 is operatively coupled with the processor 410, and transmits and/or receives a radio signal. The transceiver 430 includes a transmitter and a receiver. The transceiver 430 may include baseband circuitry to process radio frequency signals. The transceiver 430 controls the one or more antennas 431 to transmit and/or receive a radio signal.

The speaker 440 outputs sound-related results processed by the processor 410. The microphone 441 receives sound-related inputs to be used by the processor 410.

Figure 5:
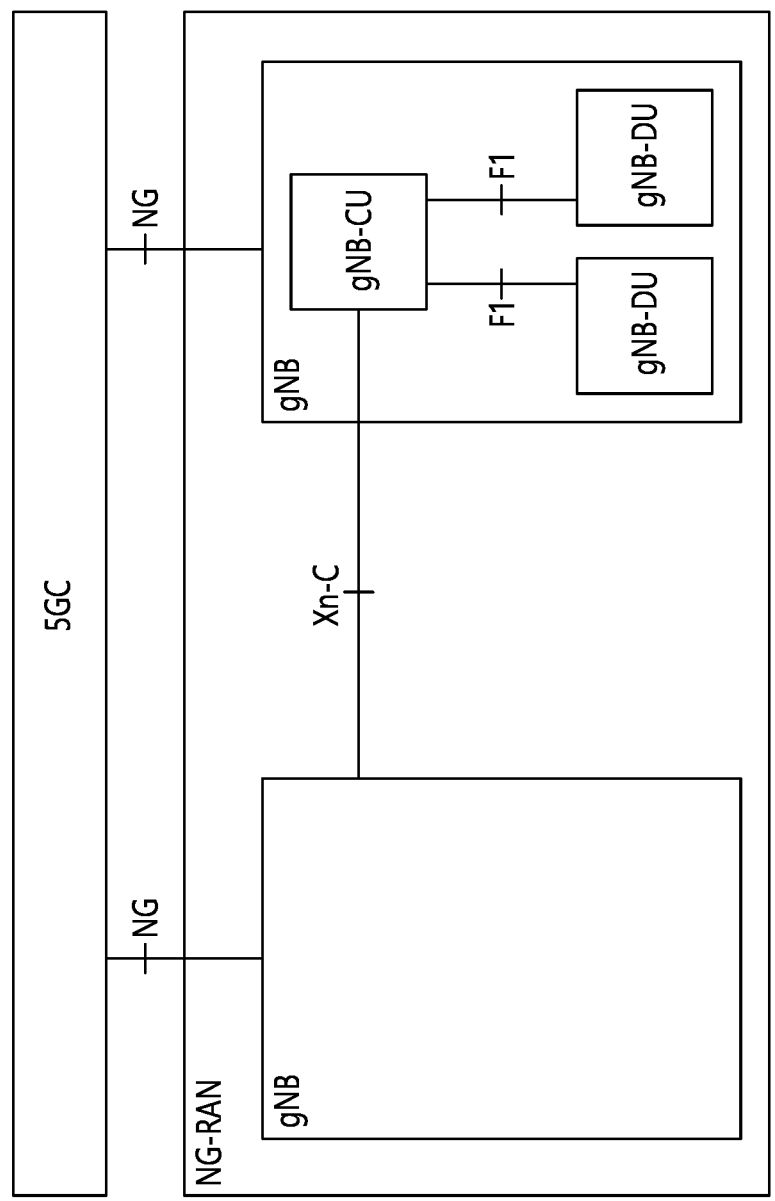
FIG. 5 shows an example of the overall architecture of a next generation radio access network (NG-RAN) to which technical features of the present disclosure can be applied.

FIG. 5 shows an example of the overall architecture of a next generation radio access network (NG-RAN) to which technical features of the present disclosure can be applied.

The NG-RAN consists of a set of gNBs connected to the 5G core network (5GC) through the NG interface.

An gNB can support frequency division duplex (FDD) mode, time division duplex (TDD) mode or dual mode operation.

gNBs can be interconnected through the Xn interface.

Referring to FIG. 5, a gNB may include a gNB central unit (gNB-CU, hereinafter, gNB-CU may be simply referred to as CU) and one or more gNB distributed unit(s) (gNB-DU(s), hereinafter, gNB-DU may be simply referred to as DU).

The gNB-CU is a logical node hosting radio resource control (RRC), service data adaptation protocol (SDAP) and packet data convergence protocol (PDCP) protocols of the gNB or RRC and PDCP protocols of the en-gNB that controls the operation of one or more gNB-DUs. The gNB-CU terminates the F1 interface connected with the gNB-DU.

The gNB-DU is a logical node hosting radio link control (RLC), media access control (MAC), and physical layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU.

A gNB-CU and a gNB-DU is connected via F1 interface.

One gNB-DU is connected to only one gNB-CU.

In case of network sharing with multiple cell identity (ID) broadcast, each cell identity associated with a subset of public land mobile networks (PLMNs) corresponds to a gNB-DU and the gNB-CU it is connected to, i.e. the corresponding gNB-DUs share the same physical layer cell resources.

For resiliency, a gNB-DU may be connected to multiple gNB-CUs by appropriate implementation.

NG, Xn and F1 are logical interfaces.

For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

The node hosting user plane part of NR PDCP (e.g. gNB-CU, gNB-CU-UP, and for EN-DC, master eNodeB (MeNB) or secondary gNB (SgNB) depending on the bearer split) shall perform user inactivity monitoring and further informs its inactivity or (re)activation to the node having C-plane connection towards the core network (e.g. over E1, X2). The node hosting NR RLC (e.g. gNB-DU) may perform user inactivity monitoring and further inform its inactivity or (re)activation to the node hosting control plane, e.g. gNB-CU or gNB-CU control plane (gNB-CU-CP).

UL PDCP configuration (i.e. how the UE uses the UL at the assisting node) is indicated via X2-C (for EN-DC), Xn-C (for NG-RAN) and F1-C. Radio link outage/resume for DL and/or UL is indicated via X2-U (for EN-DC), Xn-U (for NG-RAN) and F1-U.

The NG-RAN is layered into a radio network layer (RNL) and a transport network layer (TNL).

The NG-RAN architecture, i.e. the NG-RAN logical nodes and interfaces between them, is defined as part of the RNL.

For each NG-RAN interface (NG, Xn, F1) the related TNL protocol and the functionality are specified. The TNL provides services for user plane transport, signaling transport.

In NG-Flex configuration, each NG-RAN node is connected to all access and mobility functions (AMFs) of AMF sets within an AMF region supporting at least one slice also supported by the NG-RAN node.

Figure 6:
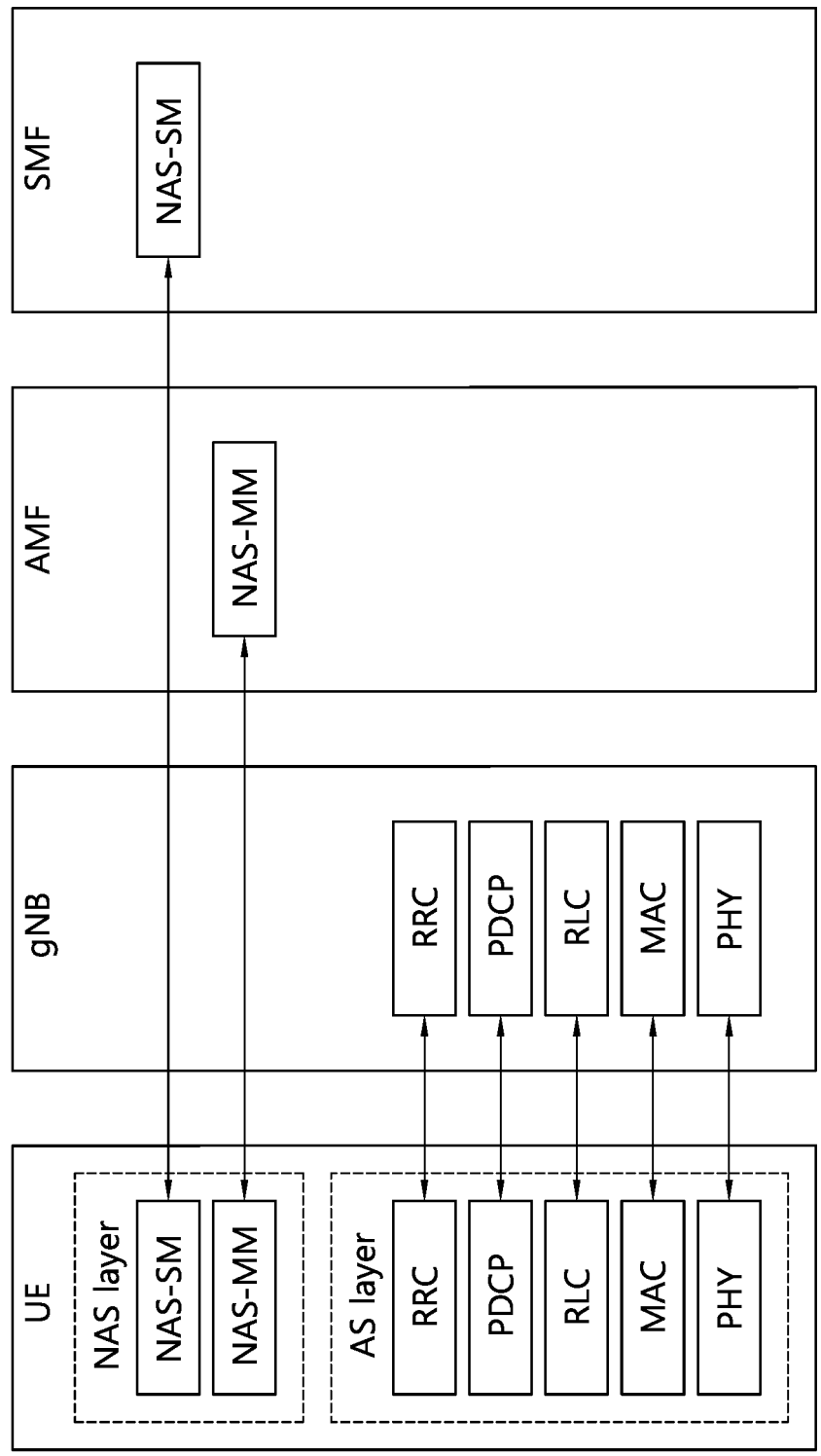
FIG. 6 shows an example of a protocol structure between network entities to which the technical features of the present disclosure can be applied.

FIG. 6 shows an example of a protocol structure between network entities to which the technical features of the present disclosure can be applied.

Layers of a radio interface protocol between the UE and the network may be classified into a first layer (L1), a second layer (L2), and a third layer (L3) based on the lower three layers of the open system interconnection (OSI) model that is well-known in the communication system.

Referring to FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 7:
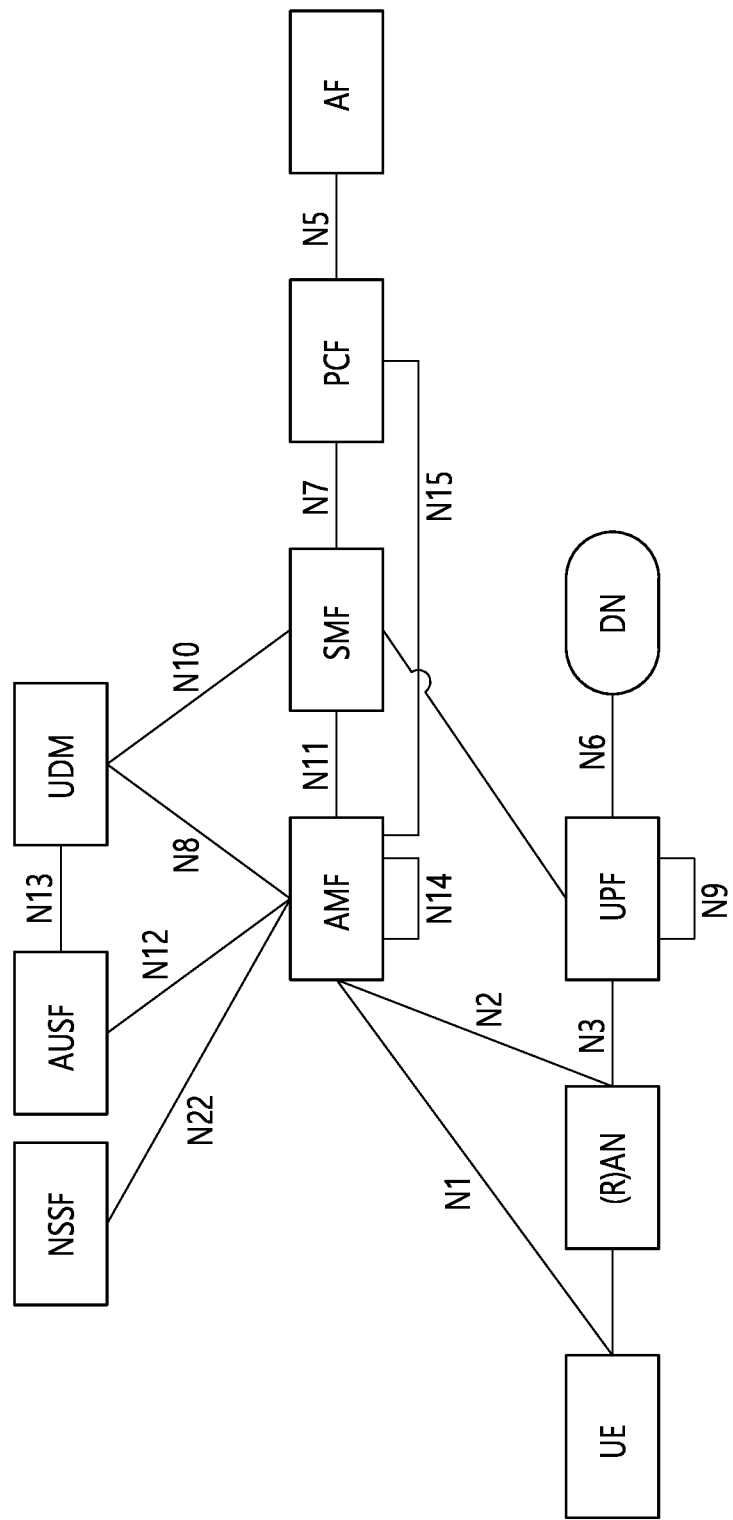
FIG. 7 shows an example of 5G system architecture to which the technical features of the present disclosure can be applied.

FIG. 7 shows an example of 5G system architecture to which the technical features of the present disclosure can be applied.

The 5G System architecture consists of the following network functions (NF).
 Authentication Server Function (AUSF)
 Access and Mobility Management Function (AMF)
 Data Network (DN), e.g. operator services, Internet access or 3rd party services
 Unstructured Data Storage Function (UDSF)
 Network Exposure Function (NEF)
 Network Repository Function (NRF)
 Network Slice Selection Function (NSSF)
 Policy Control Function (PCF)
 Session Management Function (SMF)
 Unified Data Management (UDM)
 Unified Data Repository (UDR)
 User Plane Function (UPF)
 UE radio Capability Management Function (UCMF)
 Application Function (AF)
 User Equipment (UE)
 (Radio) Access Network ((R)AN)
 5G-Equipment Identity Register (5G-EIR)
 Network Data Analytics Function (NWDAF)
 CHarging Function (CHF)

The 5G System architecture also comprises the following network entities:
 Service Communication Proxy (SCP)
 Security Edge Protection Proxy (SEPP)

Furthermore, the following network functions may be considered.
 Non-3GPP InterWorking Function (N3IWF)
 Trusted Non-3GPP Gateway Function (TNGF)
 Wireline Access Gateway Function (W-AGF)

Enhanced calling name (eCNAM) is described. Section 8.2.24 of 3GPP TS 22.173 V17.0.0 can be referred.

The eCNAM service provides the terminating party with the eCNAM identity data of the originating party. The eCNAM identity data consists of a name and metadata. This service is available to a user only after subscription.

The size of the eCNAM identity data can be up to 1000 characters.

The eCNAM service informs and protects terminating users from fraud attempts (e.g., fraudulent robocalls) through its retrieval, assembly and delivery of the call metadata together with the results of the Caller Identity Analytics function, which is a verification function that analyzes a large set of traffic data to identify fraud and caller identity spoofing trends and make risk recommendations about the originating telephone number based on trend analysis.

The Caller Identity Analytics function is expected to encompass the results of verification, such as the Secure Telephone Identity Revisited (STIR)/Signature-based Handling of Asserted information using to KENs (SHAKEN).

The eCNAM service combines its metadata and the results of the Caller Identity Analytics function so that the end user receives an all-inclusive display of the pertinent call information. As a result, the end user receives the eCNAM metadata, authentication and verification mechanisms, and the outcome of the Caller Identity Analytics in the same eCNAM message.

The terminating service provider shall extract the originating party's telephone number from the originating party identity (e.g., from the tel-URI) to use in its query to retrieve eCNAM identity data from an authoritative data source. eCNAM identity data includes any information that allows the recipient to identify or contact the calling party, including the telephone number, name, logo.

The terminating service provider shall ensure that the received calling number is verified.

If the terminating service provider determines that the originating party's telephone number is verified and Originating Identification Restriction (OIR) is not invoked, the terminating service provider shall retrieve the originating party's eCNAM identity data.

If the originating party's telephone number cannot be obtained, eCNAM identity data may not be available and the terminating service provider shall indicate the unavailability of the eCNAM identity data to the terminating party.

If the originating party's telephone number cannot be verified, eCNAM identity data may not be displayed to the user. However, subject to service provider policy, the results of the Caller Identity Analytics function—if available— shall be included in the eCNAM message delivered to the UE.

The interface between the terminating service provider (eCNAM service) and the Caller Identity Analytics function shall be private and secure.

The Caller Identity Analytics function is expected to have information (e.g., statistical and reputation) about the caller and/or the call that could be useful to the user. Therefore, even in the absence of a verification service, the delivery of this analytics information can protect the user against fraud and help service providers meet their regulatory obligations.

The terminating service provider shall obtain the eCNAM identity data from a trusted source. This trusted source may be the originating service provider or a third party with a business arrangement with the originating service provider. The interface between the terminating service provider and the trusted data source shall be private and secure.

The conditions for exchange of data are governed by regional regulatory administration and through service provider agreement.

The terminating service provider's delivery of originating party's eCNAM identity data to the terminating party shall be subject to OIR.

If a terminating service provider requests a data element that the originating party did not consent to releasing, the data element shall not be returned.

A trusted source contains subscriber identity information that is obtained directly from the subscriber's communications service record, and is updated in near-real time with any changes in the subscriber's service record. A subscriber's communications service record is created when the user starts service with the service provider. The record contains information such as the name, address, billing information.

The service provider shall obtain its subscribers' consent for elements listed on the subscriber's communications service record at the start of communications service, and allow the subscriber to modify his/her consent at any point during the service.

The metadata is intended to provide additional identity information about the originating party to the terminating party. The originating party's privacy is a primary factor determining presentation of his/her metadata to the terminating party; no identity information is presented without his/her consent. Examples of the metadata include: the postal code, the preferred language, the business name and the business segment. The metadata delivered can vary from one service provider to another. The metadata offered by each service provider is subject to expansion and modifications over time, as more data or updated data becomes available about the originating party.

For the eCNAM service, the originating and terminating service providers shall agree on the retrievable metadata with the originating party's consent based on regional regulations.

The eCNAM service shall support a service provider policy to establish the priority of delivering the identity data received from eCNAM query results and originating party identity data over any other data received from the originating party.

Originating Identification Presentation (OIP) and eCNAM have the same level of priority.

3GPP systems shall support the delivery of the eCNAM identity data in multiple languages (e.g., Chinese). Semantic translation is outside the scope of this standard.

3GPP systems shall relay the eCNAM identity data from the trusted sources to the terminating party without modification.

The purpose of the preceding two requirements is to deliver eCNAM in more languages, such as Chinese. However, this does not require the storage of the eCNAM data in multiple languages in the databases.

Figure 8:
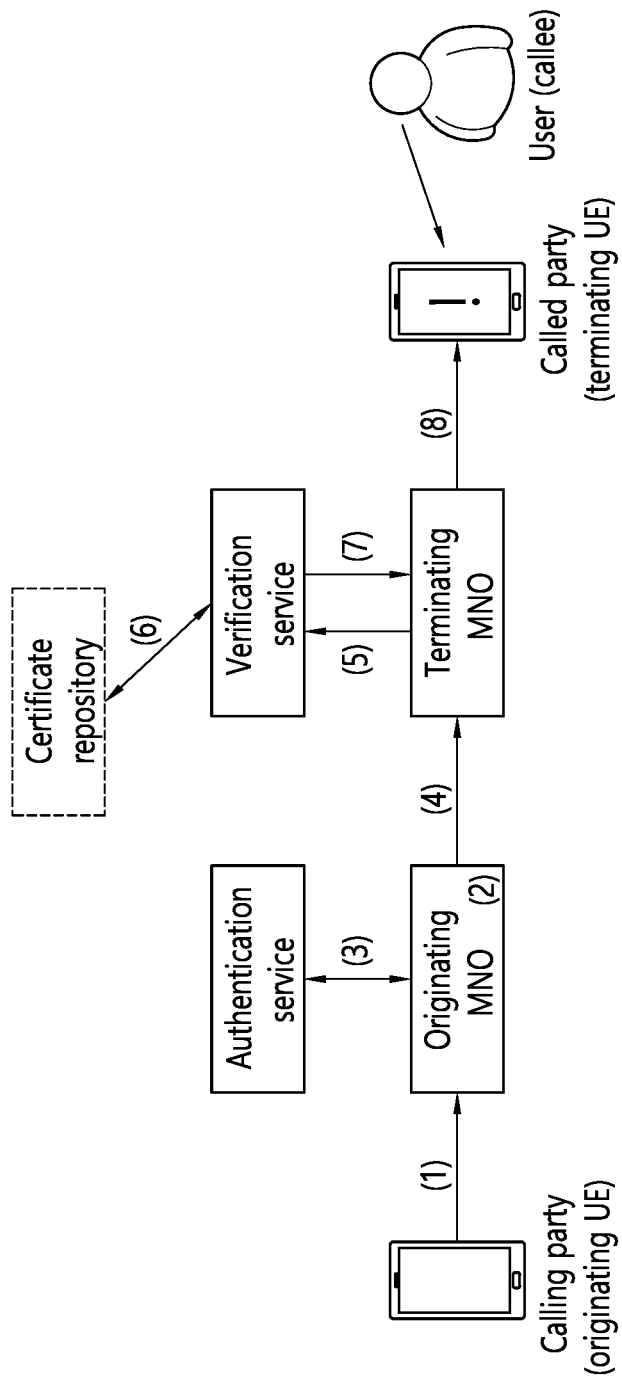
FIG. 8 shows an example of general call-flow description regarding eCNAM identity data for called party (user) to which the technical features of the present disclosure can be applied.

FIG. 8 shows an example of general call-flow description regarding eCNAM identity data for called party (user) to which the technical features of the present disclosure can be applied.

In FIG. 8, a general concept of call flow how eCNAM identity data is delivered to called party (terminating UE or user) when the originating caller has subscribed to OIP and eCNAM (and/or if OIR is not invoked) is as follows.

(1) A calling party (e.g., originating UE) makes a call towards a called party (e.g., terminating UE).

(2) An originating mobile network operator (MNO) receives the call.

(3) The origination MNO performs authentication service for the call.

(4) The origination MNO forwards the call to a terminating MNO.

(5) The terminating MNO requests a verification service for the call.

(6) The verification for the call is performed by using certificate repository.

(7) The terminating MNO receives verification information for the call.

(8) The terminating MNO forwards the call together with the verification information for the call to the called party.

The eCNAM feature has some limitations including, but not limited to: (1) the handset does not have feature to provide the user with eCNAM identity analytic data when the UE did not answer the incoming call (missed call, or rejected call), or did not receive the call at all due to some situations, e.g., out of radio network coverage.

However, the eCNAM feature is not still available for voice mail use. The eCNAM identity analytic data should be securely forward to voice mail database so that it can be stored as an envelope information together with the voice mail (voice message itself) to be provided for the UE when requested. This should not be redundant feature. If the UE is in a situation of out-of-coverage or if the UE missed the paging of incoming calls (mobile terminating (MT) calls) for any possible reasons, the UE may not receive the call and may not able to receive the caller ID and eCNAM information. If the MT call is directed to voice mail system in such situations, the trust level of the caller ID and eCNAM identity analytic data (if trust level of the caller ID is provided together with the caller ID when attempting to page) should also be directed to the voice mail system to be properly stored and linked to the voice mail.

According to some implementations of the present disclosure, a method to provide trust level of caller ID and/or eCNAM identity analytic data for the UE is provided when a voice mail is left by the caller, even when the UE missed the call for any reasons due to e.g., the UE is paged but did not respond, or the UE is paged but rejected, or the network paged the UE but the UE is not paged (e.g., due to out of coverage).

According to some implementations of the present disclosure, a method to configure user preference settings on the eCNAM identity analytic data including recommendation system interface on user preference setting using AI/machine learning (ML) techniques is provided, so that the UE does not have to set up her/his preference setting but the AI-based recommendation system sets up the setting via interface, using the usage statistics.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 9:
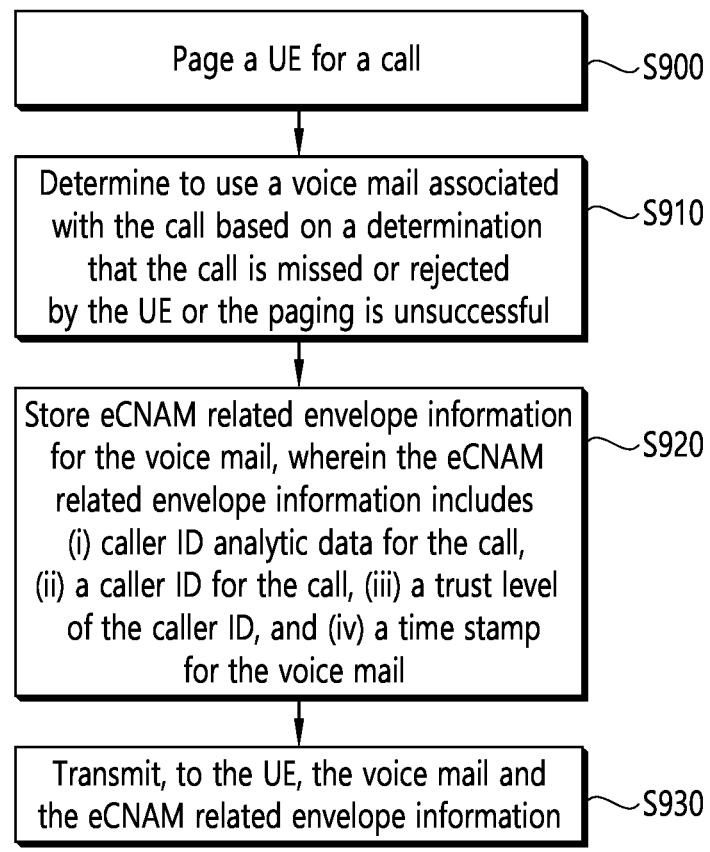
FIG. 9 shows an example of a method performed by a network to which the technical features of the present disclosure can be applied.

FIG. 9 shows an example of a method performed by a network to which the technical features of the present disclosure can be applied.

In step S900, the network pages UE for a call.

In some implementations, paging the UE may comprise transmitting, to the UE, caller identity analytic data for the call.

In step S910, the network determines to use a voice mail associated with the call based on a determination that the call is missed or rejected by the UE or the paging is unsuccessful.

In step S920, the network stores eCNAM related envelope information for the voice mail. The eCNAM related envelope information includes (i) a caller identity analytic data for the call, (ii) a caller identifier (ID) for the call, (iii) a trust level of the caller ID, and (iv) a time stamp for the voice mail.

In some implementations, the caller ID may include a phone number for which the call is originated.

In some implementations, the trust level of the caller ID may include at least one of (i) the caller ID is verified as authentic, (ii) the caller ID is verified as spoofed, and/or (iii) the caller ID is not verified. Those three trust levels of the caller ID may be only exemplary, and may include other trust levels.

Those three trust levels of the caller ID may correspond to basic category of trust levels. Furthermore, each basic category of trust levels may include additional category of trust levels. For example, the basic category of trust levels that the caller ID is verified as spoofed may include additional category of trust levels indicating that the caller ID was previously verified as authentic but now is verified as spoofed. For example, the basic category of trust levels that the caller ID is not verified may further include additional category of trust levels indicating that the caller ID was previously verified as authentic but now is not verified.

In some implementations, the network may record the voice mail.

In step S930, the network transmits, to the UE, the voice mail and the eCNAM related envelope information.

In some implementations, the network may transmit, to the UE, an indication indicating that the eCNAM related envelope information is configured for the voice mail.

In some implementations, the paging step and transmitting step (i.e., steps S900, S930) may be performed by a RAN node and/or gNB. In some implementations, the determining step and storing step (i.e., steps S910, S920) may be performed by a specific function of the network related to the voice mail.

Figure 10:
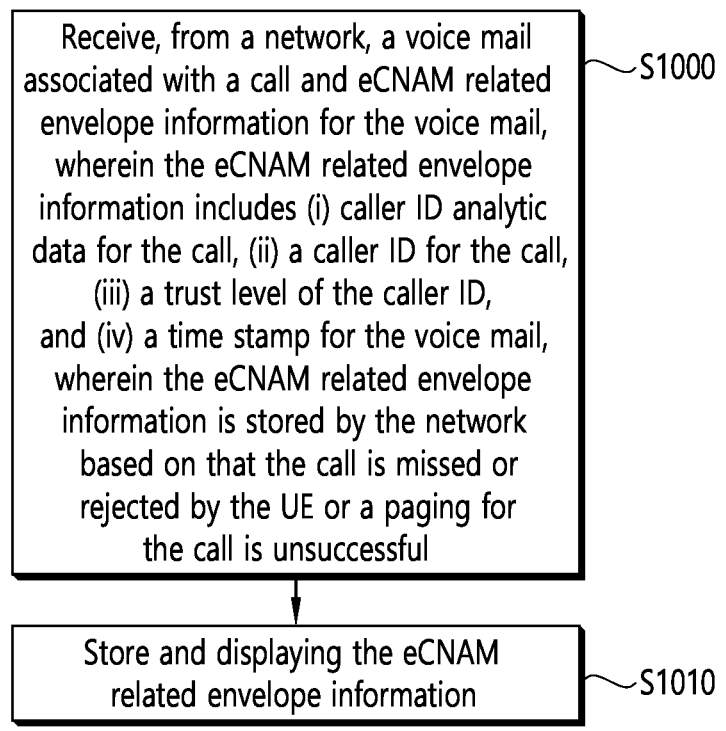
FIG. 10 shows an example of a method performed by a UE to which the technical features of the present disclosure can be applied.

FIG. 10 shows an example of a method performed by a UE to which the technical features of the present disclosure can be applied.

In step S1000, the UE receives, from a network, a voice mail associated with a call and eCNAM related envelope information for the voice mail. The eCNAM related envelope information includes (i) a caller identity analytic data for the call, (ii) a caller identifier (ID) for the call, (iii) a trust level of the caller ID, and (iv) a time stamp for the voice mail. The eCNAM related envelope information is stored by the network based on that the call is missed or rejected by the UE or a paging for the call is unsuccessful;

In step S1010, the UE stores and displaying the eCNAM related envelope information.

In some implementations, the caller ID may include a phone number for which the call is originated.

In some implementations, the trust level of the caller ID may include at least one of (i) the caller ID is verified as authentic, (ii) the caller ID is verified as spoofed, and/or (iii) the caller ID is not verified. Those three trust levels of the caller ID may be only exemplary, and may include other trust levels.

Those three trust levels of the caller ID may correspond to basic category of trust levels. Furthermore, each basic category of trust levels may include additional category of trust levels. For example, the basic category of trust levels that the caller ID is verified as spoofed may include additional category of trust levels indicating that the caller ID was previously verified as authentic but now is verified as spoofed. For example, the basic category of trust levels that the caller ID is not verified may further include additional category of trust levels indicating that the caller ID was previously verified as authentic but now is not verified.

In some implementations, the UE may receive, from the network, an indication indicating that the eCNAM related envelope information is configured for the voice mail. The eCNAM related envelope information may be stored and displayed based on the indication.

In some implementations, a user preference setting including a recommendation system interface on the user preference setting using AI/ML techniques may be configured for the eCNAM identity analytic data.

Figure 11:
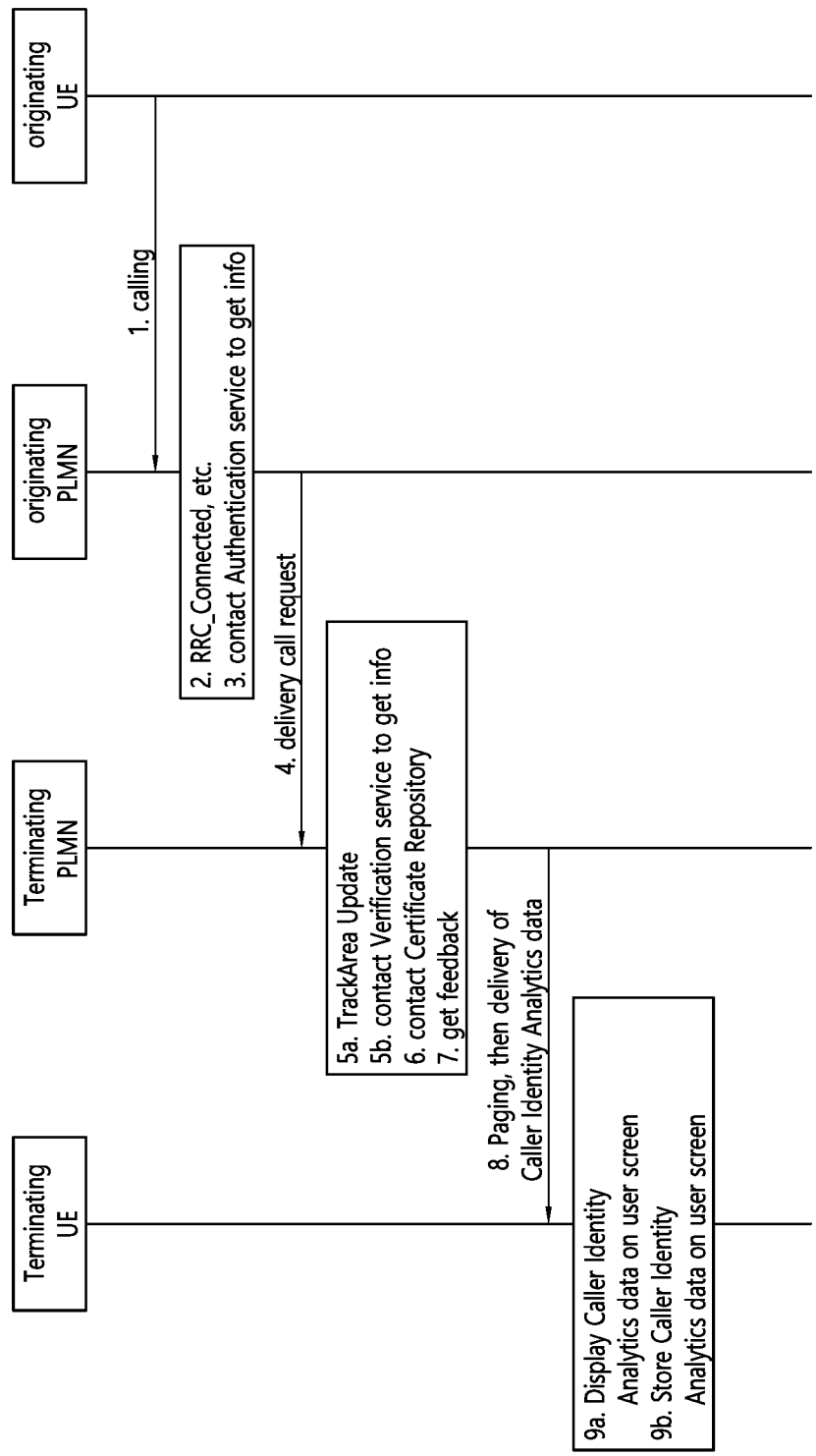
FIG. 11 shows an example of a method regarding voice mail envelope information to which the technical features of the present disclosure can be applied.

FIG. 11 shows an example of a method regarding voice mail envelope information to which the technical features of the present disclosure can be applied.

Operations of FIG. 11 is as follows.

Step 1: The originating UE makes a call towards the terminating UE. The call is forwarded to the originating PLMN.

Step 2: The originating PLMN is in RRC_CONNECTED.

Step 3: The originating PLMN contacts authentication service to get information.

Step 4: The originating PLMN delivers the call request to the terminating PLMN.

Step 5: The terminating PLMN performs tracking area update, and contacts authentication service to get information.

Step 6: The terminating PLMN contacts certificate repository for verification of the call.

Step 7: The terminating PLMN gets feedback, i.e., verification information (e.g., caller identity analytic data) for the call.

Step 8: The terminating PLMN pages the terminating UE. The terminating PLMN may deliver a caller identity analytic data for the call.

Step 9: The terminating UE displays the caller identity analytic data on user screen.

The terminating UE stores the caller identity analytic data on user screen.

Figure 12:
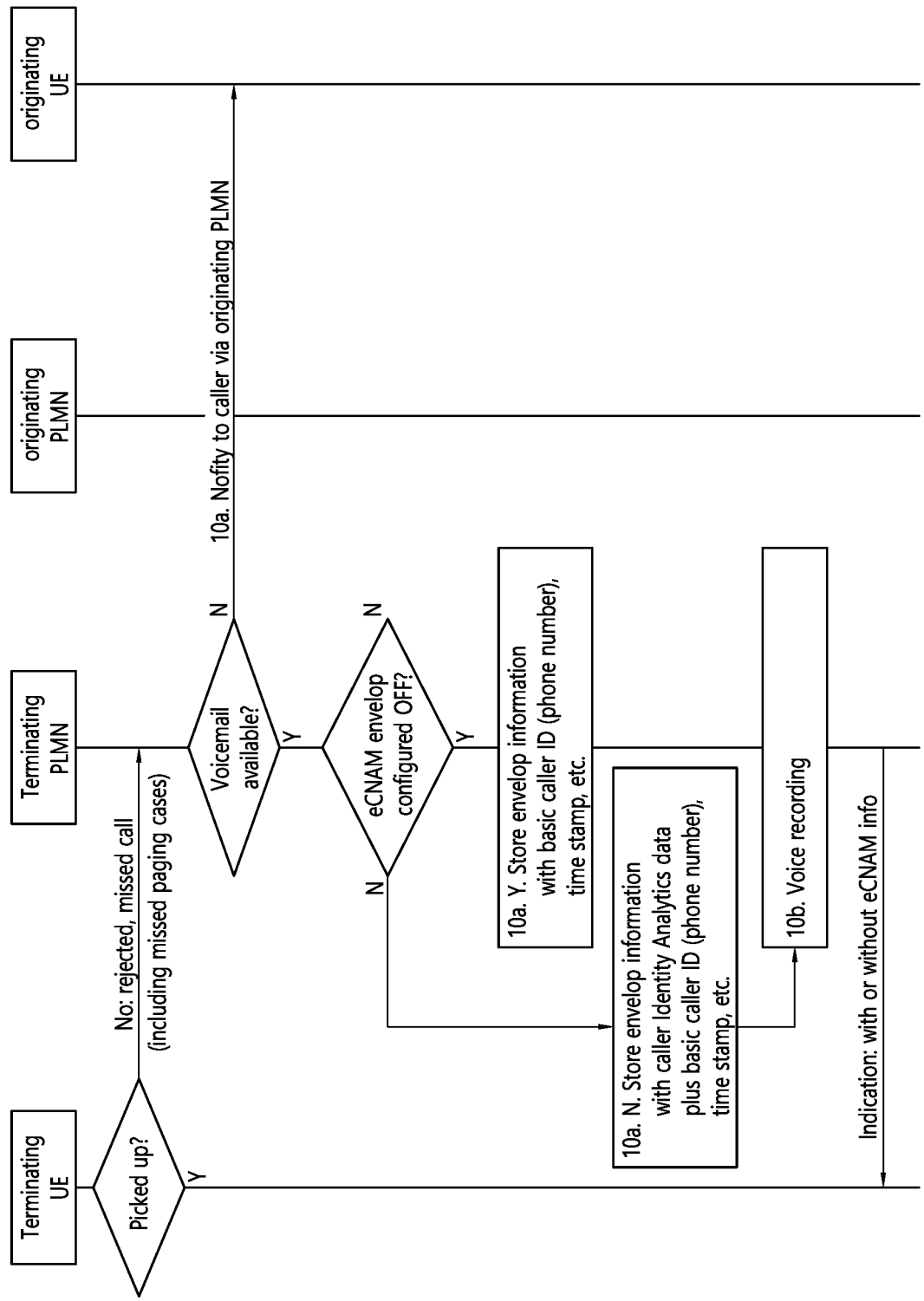
FIG. 12 shows another example of a method regarding voice mail envelope information to which the technical features of the present disclosure can be applied.

FIG. 12 shows another example of a method regarding voice mail envelope information to which the technical features of the present disclosure can be applied.

Operations of FIG. 12 are performed following the operations of FIG. 11 described above. Operations of FIG. 12 is as follows.

The terminating UE may not pick up the call. For example, even if the paging of the UE is successful, the terminal UE may miss and/or reject the call. For example, the paging of the UE may be unsuccessful.

Step 10: Thereafter, the terminating PLMN determines whether the voice mail for the call is available.

If the voice mail for the call is not available, the terminating PLMN notifies that the call to the terminating UE is unsuccessful to the original UE via the originating PLMN.

If the voice mail for the call is available, the terminating PLMN determines whether eCNAM related envelope information for the voice mail can be configured or not.

If configuration of the eCNAM related envelope information for the voice mail is "OFF", the terminating PLMN stores eCNAM related envelope information with basic caller ID (e.g., phone number), time stamp, etc.

If configuration of the eCNAM related envelope information for the voice mail is "ON", the terminating PLMN stores eCNAM related envelope information with the caller identity analytic data for the call, basic caller ID (e.g., phone number), time stamp, etc.

The terminating PLMN records the voice mail.

Thereafter, the terminating PLMN transmits an indication with or without the eCNAM related envelope information including the caller identity analytic data. The indication may indicate that the eCNAM related envelope information is configured for the voice mail.

Figure 13:
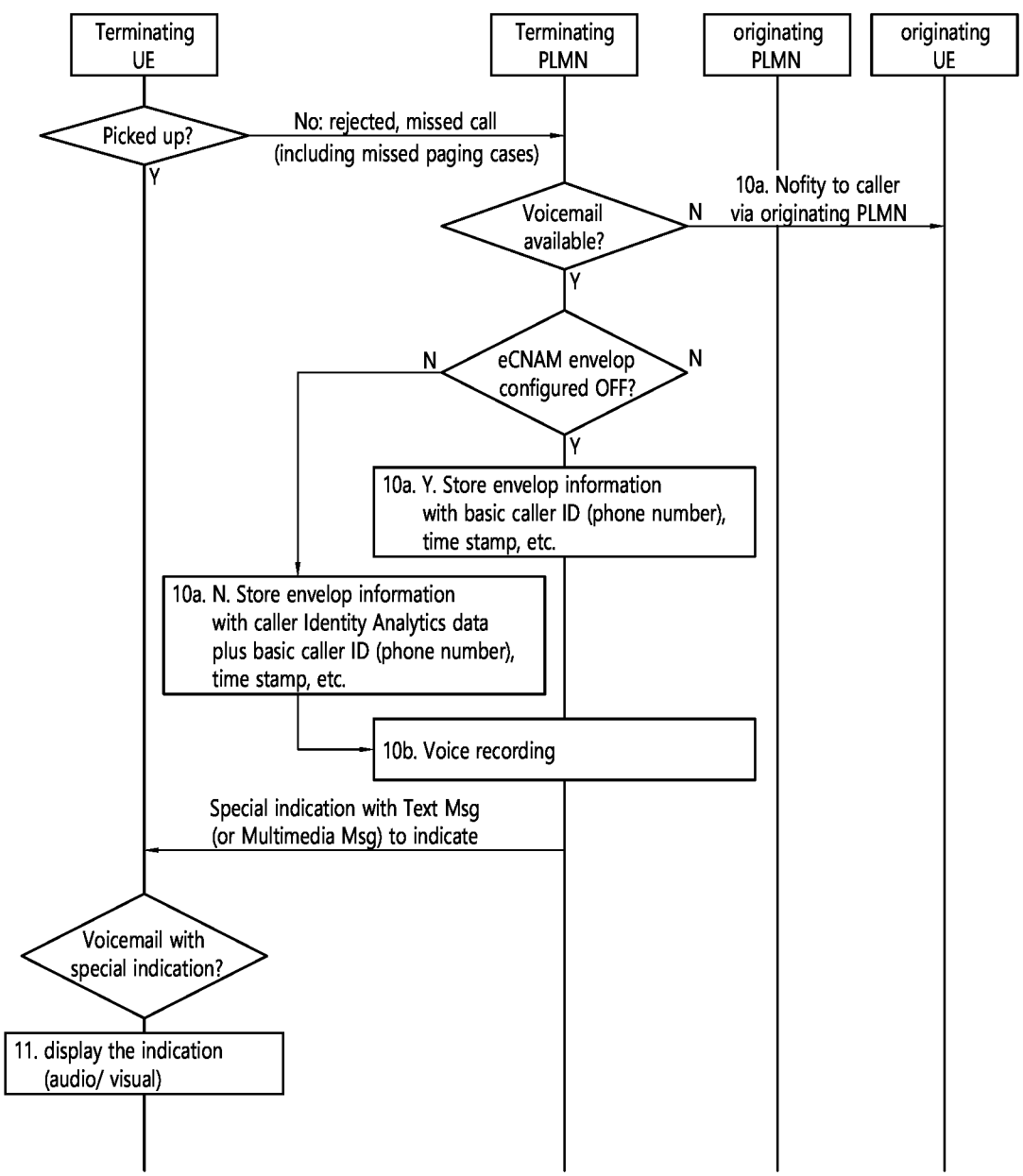
FIG. 13 shows another example of a method regarding voice mail envelope information to which the technical features of the present disclosure can be applied.

FIG. 13 shows another example of a method regarding voice mail envelope information to which the technical features of the present disclosure can be applied.

Operations of FIG. 13 are performed following the operations of FIG. 11 described above. Operations of FIG. 13 is as follows.

The only difference between the operations of FIG. 12 and the operations of FIG. 13 is that after storing eCNAM related envelope information with the caller identity analytic data for the call, basic caller ID (e.g., phone number), time stamp, etc., the network transmits a special indication with text message (or multimedia message) to indicate that the eCNAM related envelope information is configured for the voice mail. Upon receiving the voice mail with the special indication, the UE may display the special indication.

According to some implementations of the present disclosure, user preference settings may be configured as follows.

The user preference settings may be based on unstructured supplementary service data (USSD) as follows.
   *2626 #+SEND (2626=CNAM) for displaying the user preference setting status
   *26260 #+SEND for turning OFF "voice mail envelope information with eCNAM data"
   *26261 #+SEND for turning ON "voice mail envelope information with eCNAM data"

The selection of symbols (e.g., "*", or "#") are only exemplarily and other variants can be used.

Figure 14:
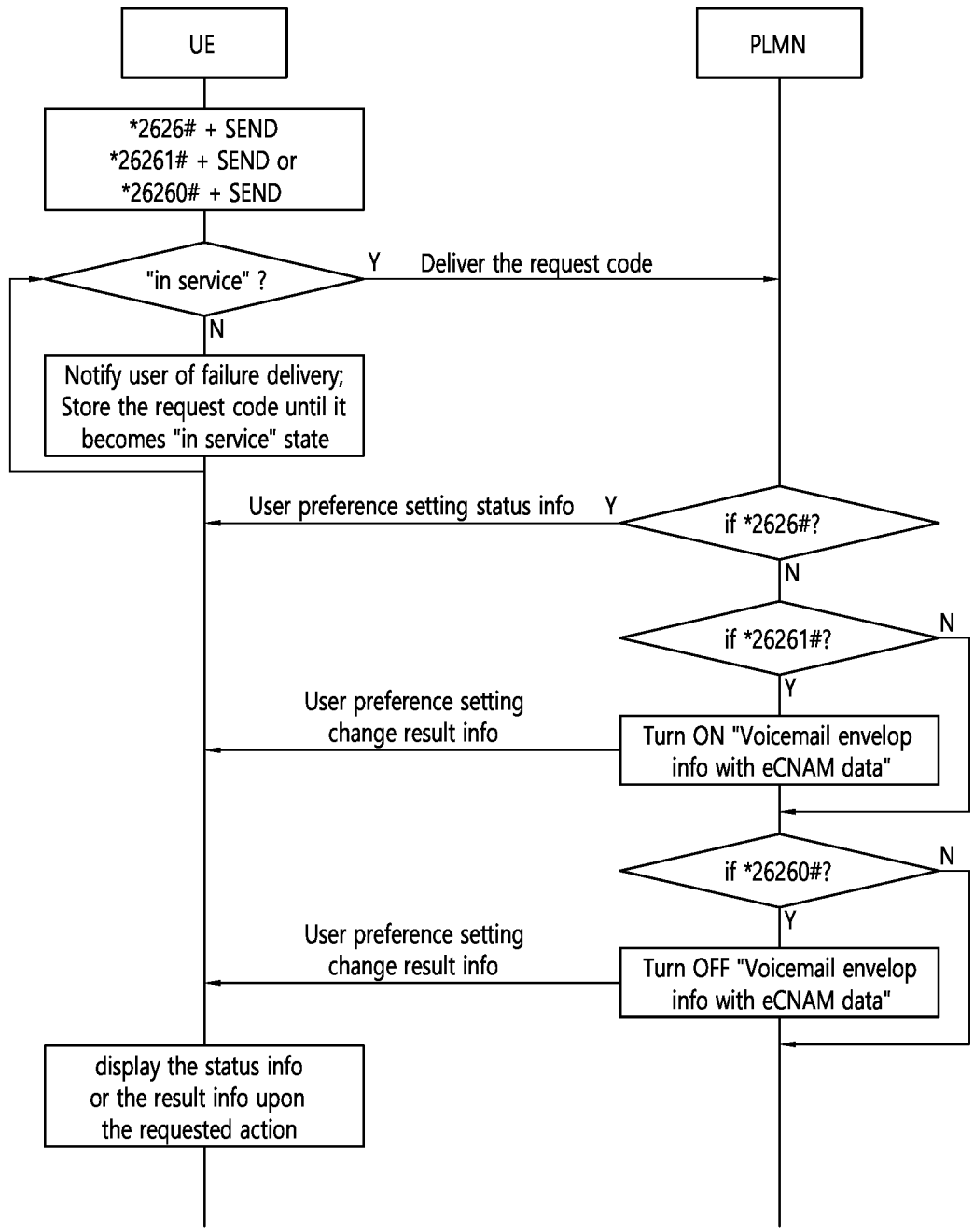
FIG. 14 shows an example of user preference setting for voice mail envelope information to which the technical features of the present disclosure can be applied.

FIG. 14 shows an example of user preference setting for voice mail envelope information to which the technical features of the present disclosure can be applied.

Operations of FIG. 14 is as follows.

The user preference settings based on USSD are configured.
   In case of "in service" (within service coverage areas, or when served by the PLMN of visited PLMN (VPLMN)), the UE sends the request code to the home PLMN (HPLMN).
   In case of "not in service" (out of service coverage areas, or when served by the PLMN of visited PLMN (VPLMN)), the UE holds and waits until it becomes "in service" state.
   If the request code received from the UE is "*2626 #", the PLMN transmits user preference setting status information to the UE.
   If the request code received from the UE is "*26261 #", the PLMN turns on "Voice mail envelope information with eCNAM data". The PLMN transmits user preference setting change result information to the UE.
   If the request code received from the UE is "*26260 #", the PLMN turns off "Voice mail envelope information with eCNAM data". The PLMN transmits user preference setting change result information to the UE.
   The UE displays the user preference setting status and/or user preference setting change result information.

For multi-USIM (MUSIM) UE/device, the same operation can be used per USIM. The USSD request can override the existing communication if the operator policy allows it. The USSD request shall not override the existing communication if the operator policy does not allow it.

According to some implementations of the present disclosure, user preference settings may be recommended by AI-based recommendation system for user preference setting as follows.

Figure 15:
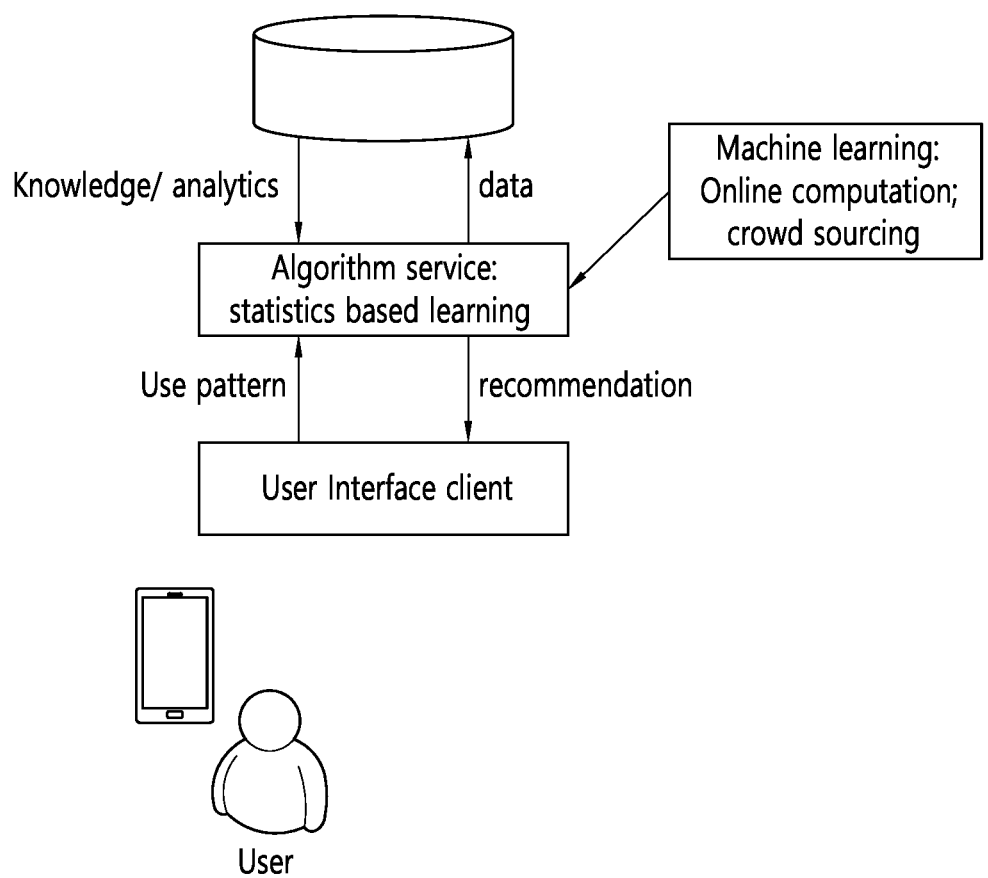
FIG. 15 shows an example of AI-based recommendation interface for user preference setting on eCNAM identity analytics data to which the technical features of the present disclosure can be applied.

FIG. 15 shows an example of AI-based recommendation interface for user preference setting on eCNAM identity analytics data to which the technical features of the present disclosure can be applied.

The AI-based recommendation interface for user preference setting on eCNAM identity analytics data shown in FIG. 15 may be applied for both for voice mail envelope information and display/storage of the data for incoming calls.

The user preference setting of the UE can be evaluated by the statistics of the user's usage and/or satisfaction based on usage statistics (e.g., occasional observation/survey for that user or such study on a group of users, e.g., of the same age class or of the same gender, or of any possible groups of people that show statistically significant implications on the usage pattern) and recommended for user to try.

This type of AI-based user preference setting recommendation can be performed by a feature within UE and/or a feature provided by MNO or the network, and/or by an authorized third party of the MNO and/or the UE vender.

The UE (when the feature is performed within UE), or the network (when the feature is performed by a network), or the MNO, or the third party (of MNO or UE vendor) may provide a secure interface b/w the display module and the entity that performs the feature.

For multi-USIM (MUSIM) UE/device, the statistical analysis (performed within UE, network, MNO, or performed in collaboration of any combination of them) can be separately performed (e.g., by different USIM) or performed together by smartly checking the estimation accuracy (e.g., variance of the quantity measure, or measure of orthogonality or non-linearity). The decision to go for separated manner or aggregated manner can also be part of the entity performing and/or involved with the feature/role.

According to some implementations of the present disclosure, the caller ID with trust level and/or the eCNAM identity analytic data can be displayed as follows.

The caller ID with trust level and/or eCNAM identity analytic data may be displayed based on user preference settings on the phone/UE. Table 3 shows an example of user preference settings for audio/visual display.

The terminating UE can provide indications for the user to identify the caller ID with trust level and/or eCNAM identity analytic data based on the different types of choice that the user has chosen as user preference setting as described in Table 3.

As one of possible option for the user, the user can also choose an option that the phone/UE does not provide/display any additional information on the caller ID with trust level and/or eCNAM identity analytic data if the user does not want to check such additional information.

When the user chooses an option that the UE does not provide/display any additional information on the caller ID with trust level and/or eCNAM identity analytic data, the UE can still keep and store the additional information so that the user can look up later when the user wants to check even after the call (established call or missed call).

According to some implementations of the present disclosure, the caller ID with trust level and/or the eCNAM identity analytic data can be stored as follows.

Figure 16:
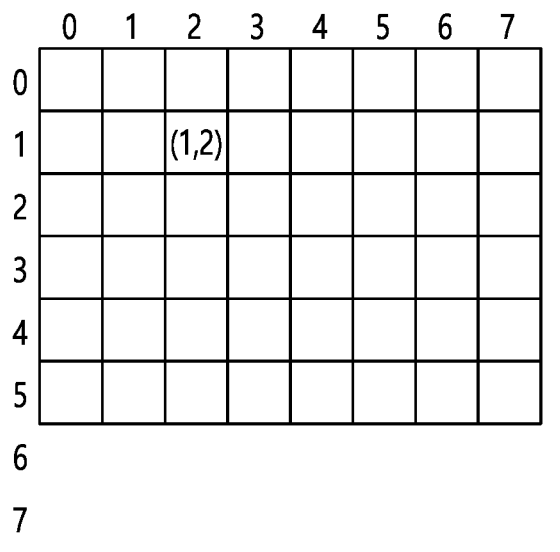

FIG. 16 shows an example of bit stream structure containing the caller ID with trust level and/or the eCNAM identity analytic data to which the technical features of the present disclosure can be applied.

The bit stream structure shown in FIG. 16 is a structure after decoding or before decoding if not encoded previously.

In FIG. 16, each row corresponds to one byte. Each pixel (a, b) means (b+1)-st bit of (a+1)-st byte. For example, first four bits can be used for denoting the trust level of the caller ID coming from the originating network and received by the terminating UE. The following "N" bits (e.g., N can be a multiple of 4 or a multiple of 8 (i.e., in bytes); or any length; this length can be predetermined or can be configurable/variable) contains the eCNAM identity analytic data that the terminating network delivers, received from the originating network, to the terminating UE. Depending on multi-SIM support capability of the terminating UE, the terminating UE can add an indicator when displaying the trust level of the caller ID and/or eCNAM identity analytic data on the user screen of the phone/device.

Figure 17:
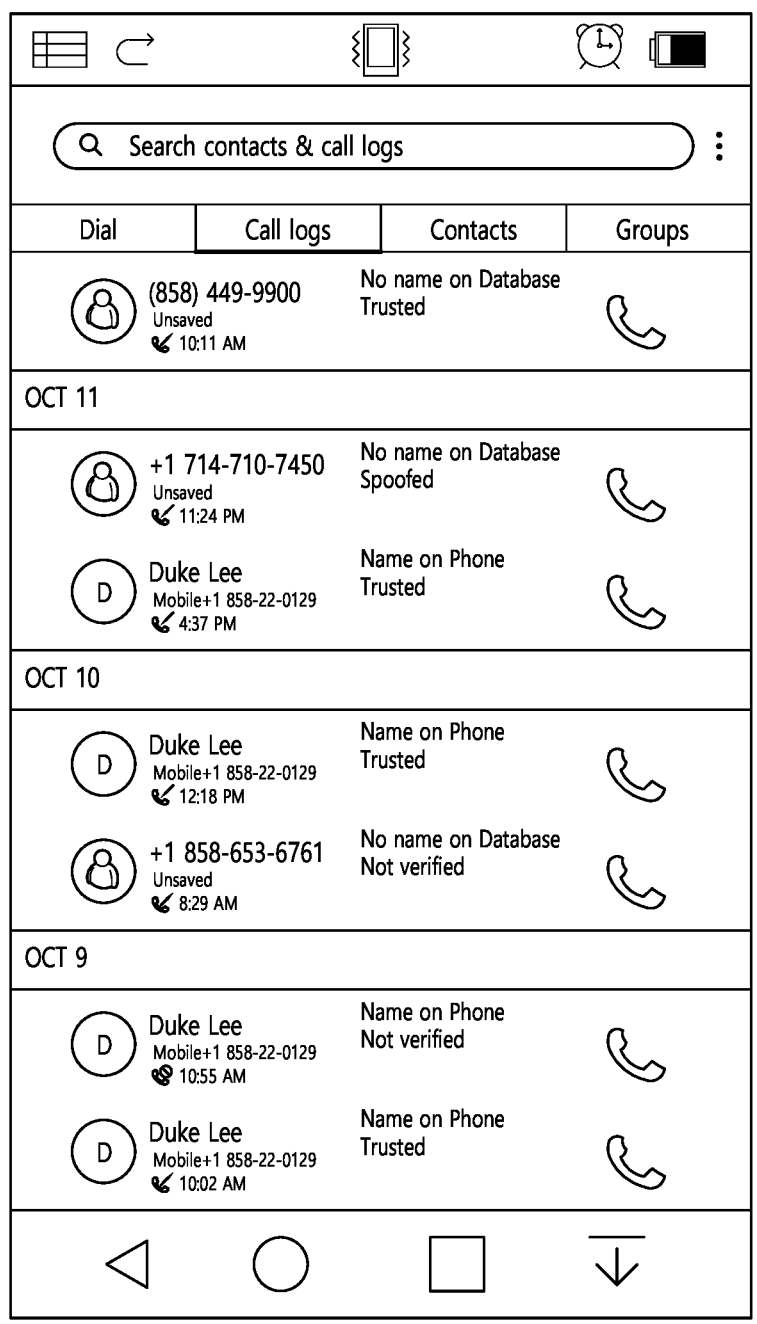
FIG. 17 shows an example of phone call logs with trust levels and eCNAM identity analytic data to which the technical features of the present disclosure can be applied.

FIG. 17 shows an example of phone call logs with trust levels and eCNAM identity analytic data to which the technical features of the present disclosure can be applied.

TABLE 3

// The Proposed User Preference Settings (example)
Function_audio_visual_display_user_preference( ) {
// options:
Option_01: 0x0001 overlay an audio signal; it is one of possible options to provide an
audio indication only for caller ID info with trusted level of "trusted"; also it is one of
possible options to provide an audio indication only for caller ID info with trust level of
"spoofed";
    a) Possible to give a timeslot before the time interval of regular ringtone, during
which timeslot there would be a specific audio indication that this incoming call is
"trusted/spoofed/not verified", e.g., recorded voice or particular identifiable/predetermined
audio signal for the user can identify before taking a look at the screen for the number and
information displayed;
    b) Possible to use the same time interval; that is, while the ringtone is being played, a
particular audio indication (e.g., recorded voice or particular audio signal) overlaid on the
ringtone;
Option_02: 0x0010 overlay a visual signal
Possible to give blinking visual indication to let the user easily identify the information
Option_04: 0x0100 overlay vibration signal
Other possible combinations (examples):
0x0011 combination of Option_01 and Option_02;
0x0111 combination of Option_01 and Option_02 and Option_04;
0x0101 combination of Option_01 and Option_04;
0x0110 combination of Option_02 and Option_04;
} // end of functions for user preference settings In call logs on the terminating UE's screen shown in FIG. 17, the caller ID, time of the event occurred, the trust level (e.g., "Trusted", "Spoofed", or "Not verified") are displayed. Furthermore, the eCNAM identity analytic data (e.g., "No Name on Database", or "Name on Phone") is also displayed. "No Name on Database" means no name was found in database based on the received caller ID whether verified/trusted or not). "Name on Phone" means the caller ID (whether Trusted/Spoofed or not verified) is found in the phone contact. If the "Phone" application does not access privilege to the phone contact of the phone device, it may show what was received from the network. However, the information that was received from the network can override what was found from the phone contact.

Figure 18:
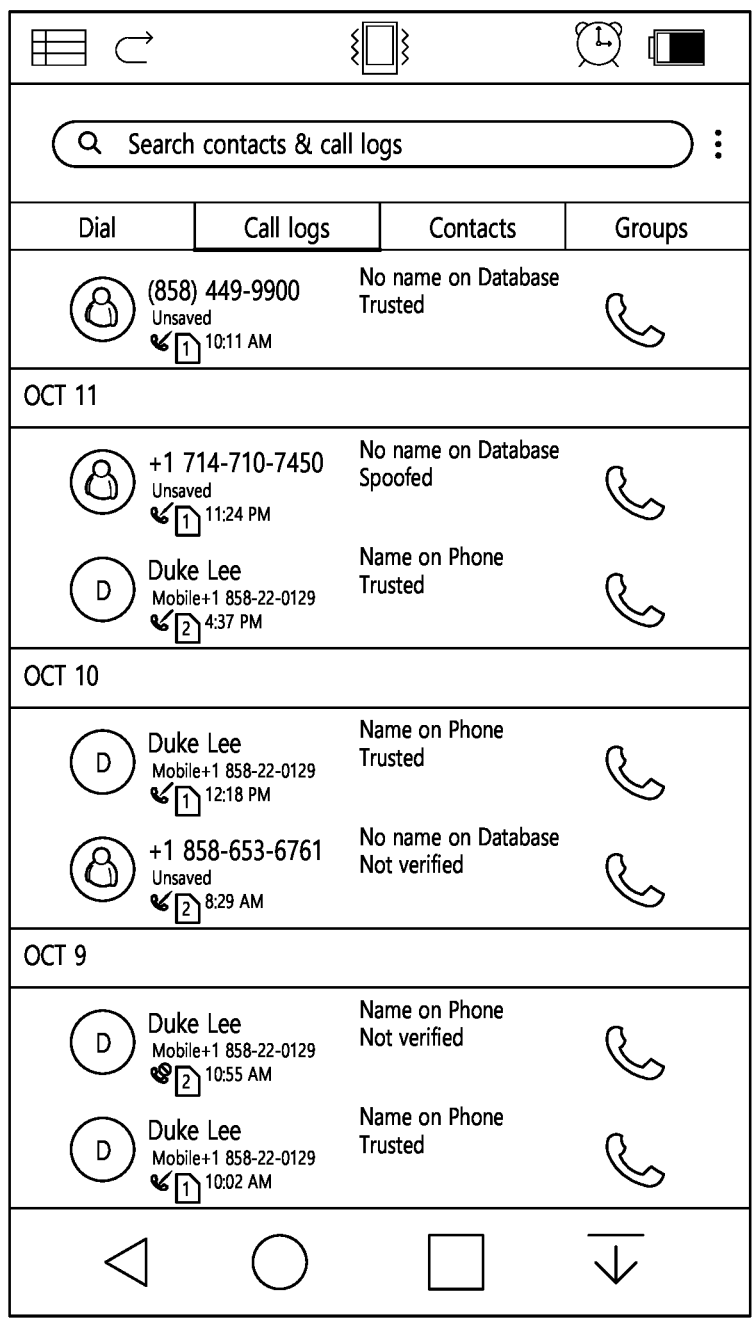
FIG. 18 shows another example of phone call logs with trust levels and eCNAM identity analytic data to which the technical features of the present disclosure can be applied.

FIG. 18 shows another example of phone call logs with trust levels and eCNAM identity analytic data to which the technical features of the present disclosure can be applied.

Depending on multi-SIM support capability of the terminating UE, the terminating UE can add an indicator when displaying the trust level of the caller ID and/or eCNAM identity analytic data on the user screen of the phone/device).

As one of possible option for the user, the user can also choose an option that the phone/UE does not store any additional information on the caller ID (e.g., in call logs) if the user does not want to check such additional information.

When the user chooses an option that the UE does not store any additional information on the caller ID (e.g. in call logs as seen in FIG. 17 or FIG. 18), the UE can still keep and store the additional information so that the user can look up later when the user wants to check even after the call (established call or missed call).

The stored information (e.g., in the call logs, or the information stored in a different way so that the user can later look up if the user wants to) can also be used forensic data.

The present disclosure can have various advantageous effects.

For example, the user can retrieve the trust level of caller ID and eCNAM analytic data when checking the voice mail even when the UE had no such information that was received from the network (e.g., missed paging).

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:
   receiving, by a terminating network from an originating network, a request for a call;
   retrieving, by the terminating network, results of a caller identity analytic function for the call;
   paging, by the terminating network, a user equipment (UE) for the call;
   transmitting, by the terminating network to the UE, an enhanced calling name (eCNAM) message for an eCNAM service, wherein the eCNAM message includes eCNAM metadata, authentication and verification mechanisms, and the results of the caller identity analytic function;
   based on the call being missed or rejected by the UE or the paging being unsuccessful, determining, by the terminating network, to use a voice mail associated with the call;
   storing, by the terminating network, eCNAM related envelope information for the voice mail, wherein the eCNAM related envelope information includes (i) a caller identity analytic data for the call, (ii) a caller identifier (ID) for the call, (iii) a trust level of the caller ID, and (iv) a time stamp for the voice mail; and
   transmitting, by the terminating network to the UE, the voice mail and the eCNAM related envelope information.

2. The method of claim 1, wherein the caller ID includes a phone number for which the call is originated.

3. The method of claim 1, further comprising recording the voice mail.

4. The method of claim 1, further comprising transmitting, to the UE, an indication indicating that the eCNAM related envelope information is configured for the voice mail.

5. The method of claim 1, wherein the trust level of the caller ID includes at least one of (i) the caller ID is verified as authentic, (ii) the caller ID is verified as spoofed, and/or (iii) the caller ID is not verified.

6. A method comprising:
   receiving, by a user equipment (UE) from a terminating network, a paging for a call;
   receiving, by the UE, from the terminating network, an enhanced calling name (eCNAM) message for an eCNAM service, wherein the eCNAM message includes eCNAM metadata, authentication and verification mechanisms, and results of a caller identity analytic function;
   displaying, by the UE, the results of the caller identity analytic function;
   based on the call being missed or rejected by the UE or a paging for the call being unsuccessful, receiving, by the UE from the terminating network, a voice mail associated with a call and enhanced calling name (eCNAM) related envelope information for the voice mail, wherein the eCNAM related envelope information includes (i) a caller identity analytic data for the call, (ii) a caller identifier (ID) for the call, (iii) a trust level of the caller ID, and (iv) a time stamp for the voice mail, wherein the eCNAM related envelope information is stored by the terminating network; and
   storing and displaying, by the UE, the eCNAM related envelope information.

7. The method of claim 6, wherein the caller ID includes a phone number for which the call is originated.

8. The method of claim 6, further comprising receiving, from the terminating network, an indication indicating that the eCNAM related envelope information is configured for the voice mail.

9. The method of claim 8, wherein the eCNAM related envelope information is stored and displayed based on the indication.

10. The method of claim 6, wherein a user preference setting including a recommendation system interface on the user preference setting using artificial intelligence (AI) or machine learning (ML) techniques is configured for the eCNAM identity analytic data.

11. The method of claim 6, wherein the trust level of the caller ID includes at least one of (i) the caller ID is verified as authentic, (ii) the caller ID is verified as spoofed, and/or (iii) the caller ID is not verified.

12. A user equipment (UE) comprising:
   at least one transceiver;
   at least one processor; and
   at least one computer memory operably connectable to the at least one processor and storing instructions that, based on being executed by the at least one processor, perform operations comprising:
   receiving, from a terminating network via the at least one transceiver, a paging for a call;
   receiving, from the terminating network via the at least one transceiver, an enhanced calling name (eCNAM) message for an eCNAM service, wherein the eCNAM message includes eCNAM metadata, authentication and verification mechanisms, and results of a caller identity analytic function;
   displaying the results of the caller identity analytic function;
   based on the call being missed or rejected by the UE or a paging for the call being unsuccessful, receiving, from the terminating network, a voice mail associated with a call and enhanced calling name (eCNAM) related envelope information for the voice mail, wherein the eCNAM related envelope information includes (i) a caller identity analytic data for the call, (ii) a caller identifier (ID) for the call, (iii) a trust level of the caller ID, and (iv) a time stamp for the voice mail, wherein the eCNAM related envelope information is stored by the terminating network; and
   storing and displaying the eCNAM related envelope information.

13. The UE of claim 12, wherein the caller ID includes a phone number for which the call is originated.

14. The UE of claim 12, wherein the operations further comprise receiving, from the terminating network via the at least one transceiver, an indication indicating that the eCNAM related envelope information is configure for the voice mail.

15. The UE of claim 14, wherein the eCNAM related envelope information is stored and displayed based on the indication.

16. The UE of claim 12, wherein a user preference setting including a recommendation system interface on the user preference setting using artificial intelligence (AI) or machine learning (ML) techniques is configured for the eCNAM identity analytic data.

17. The UE of claim 12, wherein the trust level of the caller ID includes at least one of (i) the caller ID is verified as authentic, (ii) the caller ID is verified as spoofed, and/or (iii) the caller ID is not verified.

* * * * *